United States Patent
Merritt et al.

(10) Patent No.: US 11,897,618 B2
(45) Date of Patent: Feb. 13, 2024

(54) CABIN AIR COMPRESSOR WITH LIQUID COOLED PASSAGE FORMED IN THE CASE

(71) Applicant: Hamilton Sundstrand Corporation, Charlotte, NC (US)

(72) Inventors: Brent J. Merritt, Southwick, MA (US); Darryl A. Colson, Suffield, CT (US); David Anderson, Enfield, CT (US); Mark Mongillo, Southington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/130,963

(22) Filed: Dec. 22, 2020

(65) Prior Publication Data

US 2022/0194597 A1     Jun. 23, 2022

(51) Int. Cl.
*B64D 13/06*     (2006.01)
*F04D 29/58*     (2006.01)
*F04D 29/053*     (2006.01)
*F04D 29/056*     (2006.01)

(52) U.S. Cl.
CPC ......... *B64D 13/06* (2013.01); *F04D 29/5806* (2013.01); *B64D 2013/0618* (2013.01); *B64D 2013/0644* (2013.01); *B64D 2013/0688* (2013.01); *F04D 29/053* (2013.01); *F04D 29/056* (2013.01)

(58) Field of Classification Search
CPC ............ B64D 13/06; B64D 2013/0618; B64D 2013/0644; B64D 2013/0688; F04D 29/5806; F04D 29/053; F04D 29/056; F04D 29/58; F04D 25/04; F16C 3/00
See application file for complete search history.

(56) References Cited

U.S. PATENT DOCUMENTS

| | | | | |
|---|---|---|---|---|
| 2,793,506 A | * | 5/1957 | Moody | F04D 25/06 62/505 |
| 2,888,193 A | * | 5/1959 | Greenwald | F25B 1/053 415/199.1 |
| 2,938,468 A | * | 5/1960 | Kececioglu | F04C 29/0085 418/91 |
| 3,150,820 A | * | 9/1964 | Jekat | F04D 25/04 415/201 |

(Continued)

FOREIGN PATENT DOCUMENTS

| | | |
|---|---|---|
| CN | 204704134 U | 10/2015 |
| CN | 207426879 U | 5/2018 |

(Continued)

OTHER PUBLICATIONS

European Search Report; dated May 16, 2022; Application No. 21216374.5; filed: Dec. 20, 2021; 7 pages.

*Primary Examiner* — Gordon A Jones
(74) *Attorney, Agent, or Firm* — CANTOR COLBURN LLP

(57) ABSTRACT

Disclosed is a cabin air compressor (CAC) of an aircraft environmental control system, the CAC having: a CAC case defining a forward end and an aft end axially spaced apart axially from the forward end, wherein the forward end defines a compressor inlet; and a supplemental cooling passage defined by the CAC case, wherein the supplemental cooling passage is configured to direct a supplemental cooling medium through it.

10 Claims, 2 Drawing Sheets

(56) References Cited

U.S. PATENT DOCUMENTS

| | | | | |
|---|---|---|---|---|
| 3,853,433 | A * | 12/1974 | Roberts | F04D 27/0246 184/6 |
| 5,025,629 | A * | 6/1991 | Woollenweber | F01D 17/141 60/602 |
| 8,536,744 | B2 * | 9/2013 | Nagayama | H02K 9/06 310/58 |
| 9,254,920 | B2 | 2/2016 | Zhou et al. | |
| 9,467,023 | B2 | 10/2016 | Pal | |
| 10,158,273 | B2 * | 12/2018 | Yen | H02K 5/20 |
| 10,883,517 | B2 * | 1/2021 | King | F04D 29/059 |
| 2008/0022688 | A1 * | 1/2008 | Decrisantis | B64D 13/06 60/751 |
| 2009/0044548 | A1 * | 2/2009 | Masoudipour | F25B 1/04 62/505 |
| 2011/0229351 | A1 * | 9/2011 | Beers | F04D 29/58 417/372 |
| 2012/0156027 | A1 * | 6/2012 | Merritt | F04D 29/4213 415/207 |
| 2013/0119796 | A1 * | 5/2013 | Maeda | H02K 9/06 310/63 |
| 2014/0030070 | A1 * | 1/2014 | Beers | F04D 29/057 29/888.025 |
| 2014/0352913 | A1 * | 12/2014 | Eowsakul | B64D 13/08 165/59 |
| 2015/0035392 | A1 * | 2/2015 | Pal | B64D 13/00 165/104.19 |
| 2016/0298648 | A1 * | 10/2016 | Graham | F04D 29/0513 |
| 2020/0256344 | A1 | 8/2020 | Sakota et al. | |
| 2021/0114737 | A1 * | 4/2021 | Schiff | B64D 13/08 |

FOREIGN PATENT DOCUMENTS

| | | | |
|---|---|---|---|
| CN | 110513308 A | 11/2019 | |
| EP | 156978 A1 | 10/1985 | |
| EP | 1947757 A2 | 7/2008 | |
| EP | 2407380 A2 | 1/2012 | |
| EP | 2409920 A2 * | 1/2012 | B64D 13/00 |
| WO | 2020196117 A1 | 10/2020 | |

* cited by examiner

CABIN AIR COMPRESSOR WITH LIQUID COOLED PASSAGE FORMED IN THE CASE

BACKGROUND OF THE INVENTION

The subject matter disclosed herein relates to aircraft environmental control and more specifically to a cabin air compressor with a liquid cooled passage formed in the case.

Environmental control systems (ECS) are utilized on various types of aircraft for several purposes, such as in cooling systems for the aircraft. For example, components of the ECS may be utilized to remove heat from various aircraft lubrication and electrical systems and/or used to condition aircraft cabin air. The cabin air conditioner includes one or more cabin air compressors (CACs) which compress air entering the system, from an outside source or from a ram air system. The compressed air is delivered to an environmental control system to bring it to a desired temperature, and then the compressed air is delivered to the aircraft cabin. After passing through the cabin, the air is typically exhausted to the outside. The CACs are typically driven by air-cooled electric motors, which are cooled by a flow of cooling air typically drawn by the ram air system. Conditions of the CAC, such as heating of the components therein during use, are controlled to extend a useful life of the CACs.

BRIEF DESCRIPTION

Disclosed is a cabin air compressor (CAC) of an aircraft environmental control system, the CAC including: a CAC case defining a forward end and an aft end axially spaced apart axially from the forward end, wherein the forward end defines a compressor inlet; and a supplemental cooling passage defined by the CAC case, wherein the supplemental cooling passage is configured to direct a supplemental cooling medium through it.

In addition to one or more of the above disclosed aspects, or as an alternate, a bearing cooling inlet channel is defined at the aft end of the CAC case, and wherein an aft portion of the supplemental cooling passage surrounds the bearing cooling inlet channel.

In addition to one or more of the above disclosed aspects, or as an alternate, the bearing cooling inlet channel is configured to direct cooling air toward a bearing supported within the CAC case.

In addition to one or more of the above disclosed aspects, or as an alternate, the supplemental cooling medium is a liquid.

In addition to one or more of the above disclosed aspects, or as an alternate, an inlet channel of the supplemental cooling passage is formed at the aft portion of the supplemental cooling passage, wherein the inlet channel is configured to direct the supplemental cooling medium into the supplemental cooling passage.

In addition to one or more of the above disclosed aspects, or as an alternate, a forward portion the supplemental cooling passage is defined at a motor portion of the CAC case, wherein the motor portion of the CAC is axially along a rotor and stator of a motor supported within the CAC case.

In addition to one or more of the above disclosed aspects, or as an alternate, the forward portion of the supplemental cooling passage defines a forward passage surrounding the motor portion of the CAC.

In addition to one or more of the above disclosed aspects, or as an alternate, the aft portion of the supplemental cooling passage forms an aft passage surrounding the bearing cooling inlet channel.

In addition to one or more of the above disclosed aspects, or as an alternate, the forward passage and the aft passage of the supplemental cooling passage extend along respective axes that are normal to each other.

In addition to one or more of the above disclosed aspects, or as an alternate, an outlet channel for the supplemental cooling passage is defined at a forward end of the supplemental cooling passage, located adjacent a forward end of the motor portion of the CAC.

In addition to one or more of the above disclosed aspects, or as an alternate, the inlet and the outlet channels respectively include quick release adaptors.

In addition to one or more of the above disclosed aspects, or as an alternate, an inlet portion of the CAC extends aft of the forward end to a diffuser portion of the CAC; the diffuser portion extends aft of the inlet portion to a compressor rotor portion of the CAC; the compressor rotor portion extends aft of the diffuser portion to a forward bearing portion of the CAC; the forward bearing portion extends aft of the diffuser portion to a motor portion of the CAC; the motor portion extends aft of the diffuser portion to an aft bearing portion of the CAC; and the aft bearing portion extends aft of the motor portion to the aft end of the CAC, wherein the supplemental cooling passage extends from the aft bearing portion, and along the motor portion, toward the forward bearing portion of the CAC.

In addition to one or more of the above disclosed aspects, or as an alternate, the supplemental cooling passage surrounds a stator of a motor supported in the motor portion and terminates aft of the forward bearing portion.

In addition to one or more of the above disclosed aspects, or as an alternate, a forward journal bearing of the forward bearing portion is rotationally supported between a forward stationary member of the CAC case and a forward motor shaft operationally connected to a motor; and an aft journal bearing of the aft bearing portion is rotationally supported between an aft stationary member of the CAC case and an aft motor shaft operationally connected to the motor.

In addition to one or more of the above disclosed aspects, or as an alternate, a thrust bearing of the aft bearing portion is rotationally supported between the aft end of the CAC case and the aft motor shaft.

In addition to one or more of the above disclosed aspects, or as an alternate, an aircraft is disclosed, including aspects of the above disclosed environmental control system.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
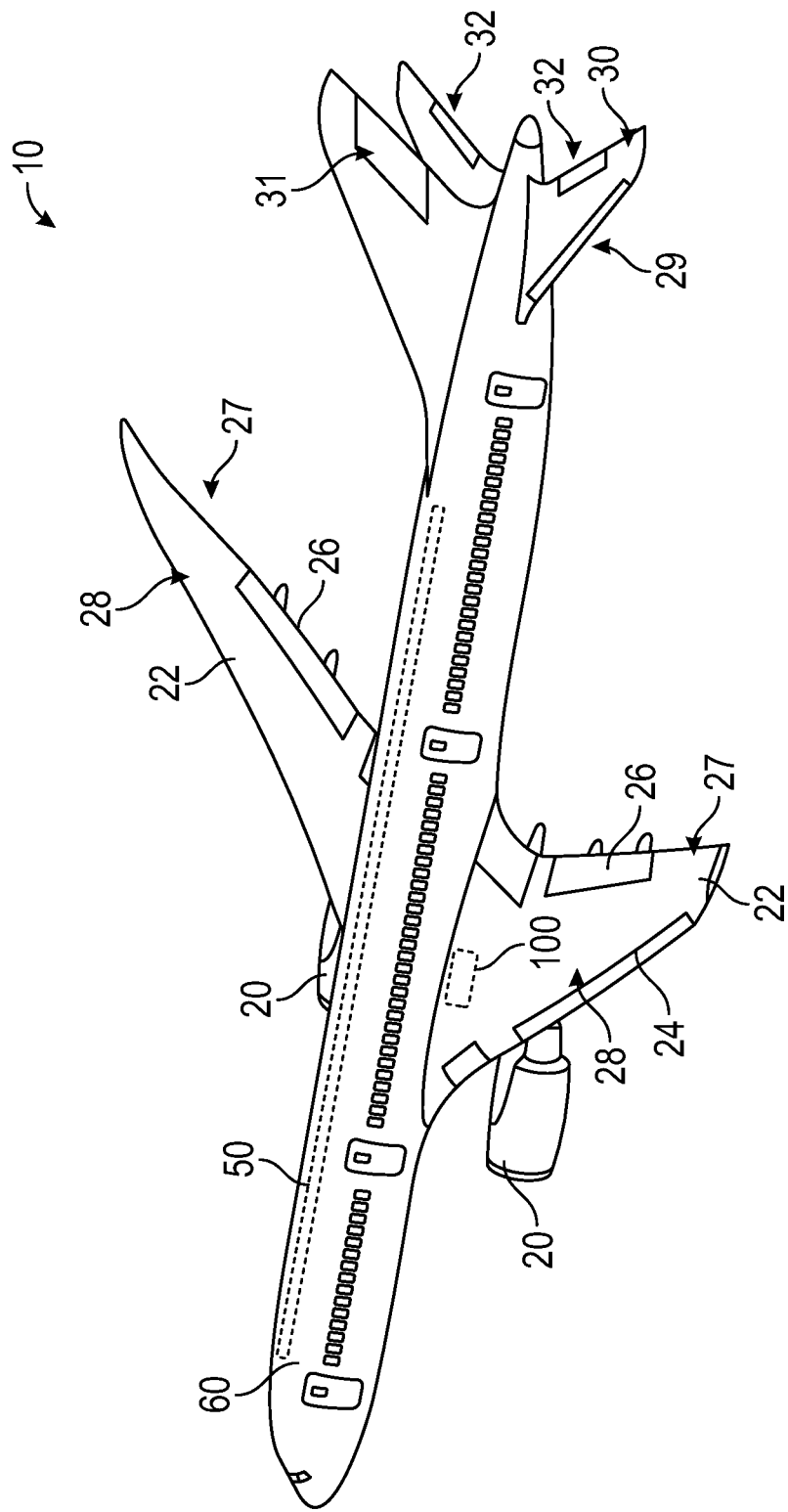
FIG. 1 is a perspective view of an aircraft where embodiments of the present invention can be implemented.

FIG. 1 illustrates an example of a commercial aircraft 10 having aircraft engines surrounded by (or otherwise carried in) a nacelle 20 housing therein a gas turbine engine. The aircraft 10 includes two wings 22 that can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage) each of which may be typically referred to as "control surfaces" as they are movable under aircraft power systems. The aircraft 10 may include an environmental control system (ECS) 50, illustrated schematically, which conditions air that is delivered to the passenger cabin 60 of the aircraft 10. The ECS 50 may receive compressed air from a cabin air compressor (CAC) 100, as indicated above.

Figure 2:
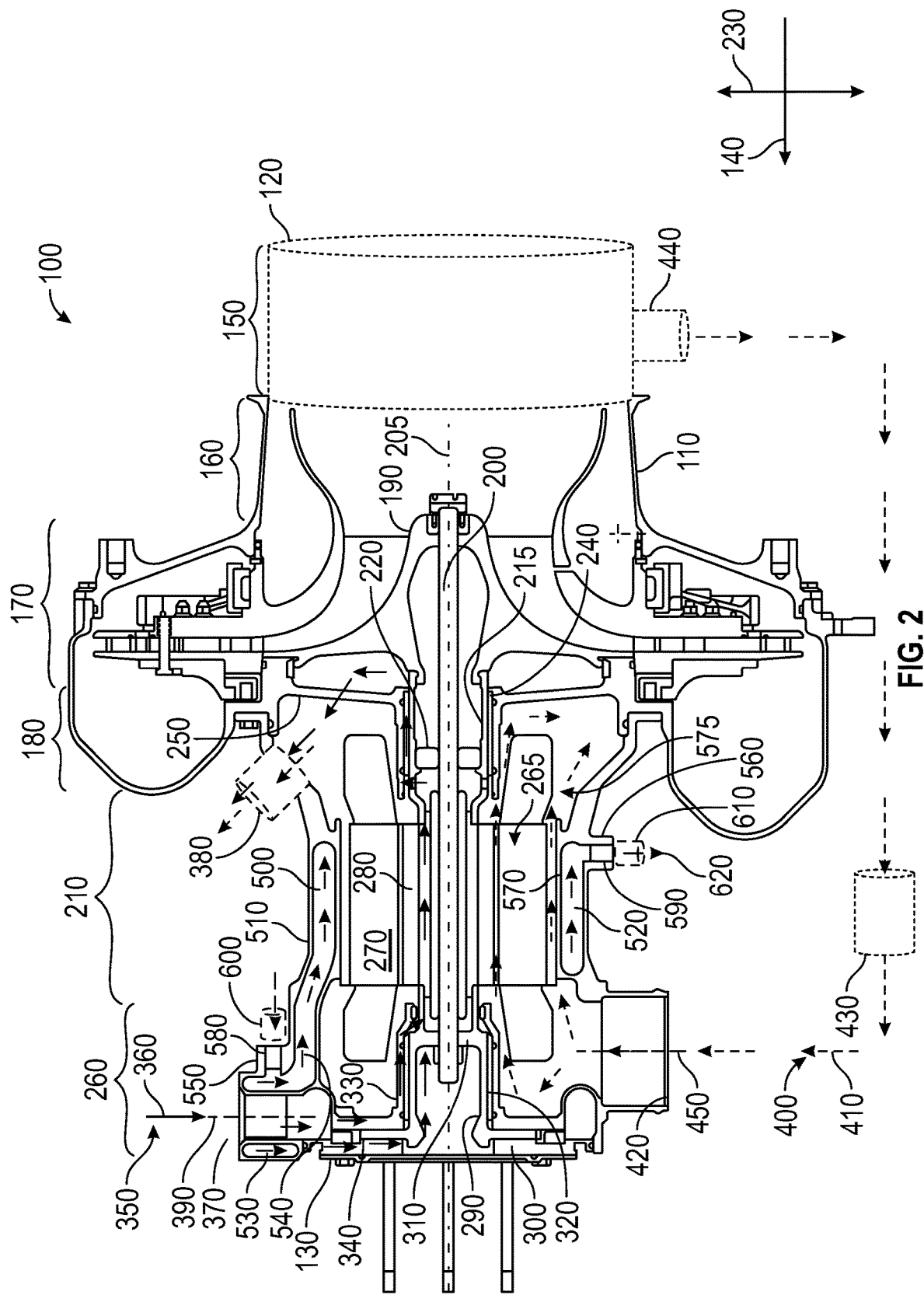
FIG. 2 is a cross-sectional view of a cabin air compressor (CAC) assembly.

The components of a CAC 100 are shown in FIG. 2 and includes a CAC case 110 extending from a case forward end 120 to a case aft end 130, where the case aft end 130 is spaced apart from the case forward end 120 in an axial aft direction 140. An inlet portion 150 (otherwise referred to as a compressor inlet portion), shown schematically, is defined by the CAC 100, aft of the case forward end 120. The inlet portion 150 extends in the axial aft direction 140 from the case forward end 120 to an add heat portion 160 of the CAC 100. The inlet portion 150 of the CAC 100 receives, for example, air from outside the aircraft, e.g., from a ram air system of the aircraft 10.

The add heat portion 160 is defined by the CAC 100, aft of the inlet portion 150. The add heat portion 160 extends in the axial aft direction 140 from the inlet portion 150 to a compressor rotor portion 170 of the CAC 100.

The compressor rotor portion 170 is defined by the CAC 100, aft of the add heat portion 160. The compressor rotor portion 170 extends axially aft from the add heat portion 160 to a forward bearing portion 180. A compressor rotor 190 is housed within the compressor rotor portion 170. The compressor rotor 190 rotates about a compressor drive rod 200 (or center drive rod) that extends in the axial aft direction 140 from the compressor rotor 190, toward the case aft end 130, and rotates about a rotation axis 205 (or center rotation axis).

The forward bearing portion 180 is defined by the CAC 100, aft of the compressor rotor portion 170. The forward bearing portion 180 extends in the axial aft direction 140 from the compressor rotor portion 170 to a motor portion 210. The compressor drive rod 200 extends axially through the forward bearing portion 180 of the CAC 100. A forward motor shaft 215 within the forward bearing portion 180 supports the compressor drive rod 200 via a forward drive rod support 220 that extends in the radial outer direction 230 between the forward motor shaft 215 and compressor drive rod 200. A forward journal bearing 240 (or forward motor support bearing) within the forward bearing portion 180 is rotationally positioned between a forward case structure 250 (stationary member) and the forward motor shaft 215.

The motor portion 210 of the CAC 100 is defined by the CAC 100, aft of the forward bearing portion 180. The motor portion 210 extends in the axial aft direction 140, from the forward bearing portion 180 to an aft bearing portion 260. A motor 265, including a motor stator 270 and a motor rotor 280, is housed within the motor portion 210. The motor stator 270 is radially exterior to and axially aligned with the motor rotor 280. The compressor drive rod 200 extends axially through the motor portion 210 of the CAC 100 and is operationally connected to the motor rotor 280, e.g., to drive the compressor rotor 190.

The aft bearing portion 260 of the CAC 100 is defined by the CAC 100, aft of the motor portion 210. The aft bearing portion 260 extends in the axial aft direction 140, from the motor portion 210 to the case aft end 130 of the CAC case 110. The compressor drive rod 200 extends the axial aft direction 140, into the aft bearing portion 260 of the CAC 100. An aft motor shaft 290 (or thrust shaft) extends in the axial aft direction 140 from the motor rotor 280 to a thrust plate 300 at the case aft end 130 of the CAC case 110. The aft motor shaft 290 supports the compressor drive rod 200 via an aft drive rod support 310 that extends in the radial outer direction 230 between the aft motor shaft 290 and compressor drive rod 200. An aft journal bearing 320 is within the aft bearing portion 260, rotationally supported between the aft motor shaft 290 and an aft support structure 330 (stationary member) of the CAC case 110, thereby supporting the compressor drive rod 200. A thrust bearing 340 engages the thrust plate 300 at the aft end of the CAC case 110. The aft journal bearing 320 and thrust bearing 340 may together be considered aft motor support bearings.

A bearing cooling circuit 350 is defined in the CAC 100 for directing a bearing cooling flow 360 of air through the CAC 100. The cooling air may also be from a primary heat exchanger of the aircraft or may be from a different source. The bearing cooling circuit 350 includes a bearing cooling inlet channel 370, formed as an inlet passage in the aft bearing portion 260 of the CAC case 110. A cooling outlet channel 380 is formed as an outlet passage in the forward bearing portion 180 of the CAC case 110. The CAC 100 is configured so that bearing cooling flow 360 is directed around the thrust bearing 340, over the aft journal bearing 320, between the compressor drive rod 200 and the motor rotor 280, over the forward journal bearing 240, and out of the cooling outlet channel 380. From there, the air may be directed overboard or utilized for other purposes. The bearing cooling inlet channel 370 may extend along a bearing cooling inlet channel axis 390 that is normal to the rotation axis 205 for the compressor rotor 190. This configuration is not intended on limiting an orientation of the bearing cooling inlet channel 370.

A motor cooling circuit 400 is defined in the CAC 100 for directing a motor cooling flow 410 of air through the CAC 100. The motor cooling circuit 400 includes a motor cooling inlet channel 420 formed in the aft bearing portion 260 of the CAC 100. The motor cooling inlet channel 420 receives the motor cooling flow 410 via a motor cooling duct 430 connected to a bleed channel 440 that is tapped off of the inlet portion 150 of the CAC 100. The CAC 100 is configured so that motor cooling flow 410 is directed between the motor rotor 280 and motor stator 270, between the motor stator 270 and the CAC case 110, and out of the cooling outlet channel 380. The motor cooling inlet channel 420 may extend along a motor cooling inlet channel axis 450 that is normal to the rotational axis 205 for the compressor rotor 190, and e.g., parallel to bearing cooling inlet channel axis 390. This configuration is not intended on limiting an orientation of the bearing cooling inlet channel 370.

CAC motor reliability is dependent on the motor and bearings operating efficiently, meaning at least in part that the components are prevented from overheating. The CAC motor, as indicated above is cooled at least partially by cooling airflows, which under certain conditions may be insufficient to provide the desired cooling levels to the motor components. This may have a direct impact on system performance.

In view of the identified concerns, a supplemental cooling passage 500 is formed in the CAC case 110. The supplemental cooling passage 500 is formed in an outer shell 510 of the CAC 100. The supplemental cooling passage 500 extends from the aft bearing portion 260 to the motor portion 210 of the CAC 100. The supplemental cooling passage 500 includes a forward portion 520, which may be a forward passage, that is formed to surround the motor 265 in the motor portion 210. The supplemental cooling passage 500 includes an aft portion 530, which may be an aft passage, that is formed to surround the bearing cooling inlet channel 370. The forward and aft portions 520, 530 may be fluidly coupled via an intermediate portion 540 of the supplemental cooling passage 500 that is axially aligned with the motor cooling inlet channel 420. The forward portion 520 and the aft portion 530 of the supplemental cooling passage 500 may be disposed on mutually normal axes. This is because, as indicated, the bearing cooling inlet channel 370 is normal to the rotation axis 205 of the motor 265.

An inlet channel 550 for the supplemental cooling passage 500 is formed in the bearing cooling inlet channel 370. An outlet channel 560 for the supplemental cooling passage 500 is formed aft of the forward bearing portion 180. That is, the outlet channel 560 is formed in the motor portion 210, at a forward end 570 (or axial forward end) of the forward portion 520, e.g., adjacent a forward end 575 (or axial forward end) of the motor portion 210 of the CAC 100. The inlet channel 550 and the outlet channel 560 for the supplemental cooling passage 500 may be configured with respective quick release adaptors 580, 590, to enable a quick release of respectively connected inlet and outlet conduits 600, 610.

A liquid flow, e.g., as a supplemental cooling medium 620, may be flushed through the supplemental cooling passage 500 to further cool the bearing cooling flow 360 and the motor 265, prolonging the useful life of the bearings and motor. For example, it is within the scope of the disclosure to utilize existing liquid cooling loops in an aircraft 10 to provide the liquid cooling flow to the CAC 100 to increase CAC reliability. Utilizing liquid loops as an additional source of cooling, e.g., to cool the bearing cooling flow 360 and cool the CAC case 110 around the motor 265, may greatly reduce motor and bearing temperatures. With the above embodiments, a primary heat removal circuit includes heat being removed from the motor portion 210, including the motor 265 therein, and the forward and aft bearing portions 180, 260, the bearings therein, including the forward and aft journal bearings 240, 320, and the thrust bearing 340, via convection by the motor cooling flow 410, and then by the motor cooling flow 410 being cooled by convection against the case 115. In turn, the case 115 conducts heat to the supplemental cooling passage 500, which removes heat by convection via fluid flowing in the supplemental cooling passage 500.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

We claim:

1. A cabin air compressor (CAC) of an aircraft environmental control system, the CAC comprising:
   a CAC case defining a forward end and an aft end axially spaced apart from the forward end,
   wherein the CAC case defines an outer shell that extends axially along CAC case, and
   wherein the CAC includes:
     an inlet portion that extends aft of the forward end;
     a compressor rotor portion located aft of the inlet portion;
     a forward bearing portion located aft of the compressor rotor portion;
     a motor portion that is surrounded by the outer shell of the CAC case and is located aft of the compressor rotor portion,
     wherein the motor portion of the CAC is axially along a rotor and stator supported within the CAC case, wherein the stator is radially exterior to the rotor;
     an aft bearing portion located aft of the motor portion, that extends to the aft end of the CAC case, wherein the aft bearing portion includes a thrust bearing that is rotationally supported at the aft end of the CAC case;
     a motor cooling circuit including: a bleed channel defined in the inlet portion; a motor cooling inlet channel defined in the aft bearing portion of the CAC, and a motor cooling duct extending between the bleed channel and the motor cooling inlet channel,
     wherein the motor cooling duct is radially exterior to the outer shell of the CAC case along the motor portion of the CAC;
     a bearing cooling inlet channel defined at the aft end of the CAC case, aft of the motor portion, the bearing cooling inlet channel being configured to direct cooling air into the aft bearing portion and toward the thrust bearing; and
     a supplemental cooling passage formed in the outer shell of the CAC case, at the aft bearing portion and extending along the motor portion, toward the forward bearing portion of the CAC,
     wherein:
       an aft portion of the supplemental cooling passage, located aft of the motor portion, forms an aft passage that surrounds the bearing cooling inlet channel;
       a forward portion of the supplemental cooling passage is defined along the motor portion of the CAC case,
       wherein the forward portion includes a forward passage that is formed in the outer shell of the CAC case and surrounds the motor portion of the CAC,. and the forward passage is radially exterior to the stator; and the supplemental cooling passage is configured to direct a supplemental cooling medium therethrough.

2. The CAC of claim 1, wherein:
the supplemental cooling medium is a liquid.

3. The CAC of claim 1, wherein:
an inlet channel of the supplemental cooling passage is formed at the aft portion of the supplemental cooling passage, wherein the inlet channel is configured to direct the supplemental cooling medium into the supplemental cooling passage.

4. The CAC of claim 1, wherein:
the forward passage and the aft passage of the supplemental cooling passage extend along respective axes that are normal to each other.

5. The CAC of claim 1, wherein:
an outlet channel for the supplemental cooling passage is defined at a forward end of the supplemental cooling passage, located adjacent a forward end of the motor portion of the CAC.

6. The CAC of claim 5, wherein:
the inlet and the outlet channels respectively include quick release adaptors.

7. The CAC of claim 1, wherein:
the supplemental cooling passage terminates aft of the forward bearing portion.

8. The CAC of claim 1, wherein:
a forward journal bearing of the forward bearing portion is rotationally supported between a forward stationary member of the CAC case and a forward motor shaft operationally connected to a motor; and
an aft journal bearing of the aft bearing portion is rotationally supported between an aft stationary member of the CAC case and an aft motor shaft operationally connected to the motor.

9. The CAC of claim 8, wherein:
the thrust bearing is rotationally supported between the aft end of the CAC case and the aft motor shaft.

10. An aircraft, comprising:
an environmental control system, including the CAC of claim 1.

* * * * *